(12) United States Patent
Hosaka

(10) Patent No.: US 12,206,628 B2
(45) Date of Patent: Jan. 21, 2025

(54) INFORMATION PROCESSING METHOD, STORAGE MEDIUM, AND INFORMATION PROCESSING APPARATUS

(71) Applicant: CANON KABUSHIKI KAISHA, Tokyo (JP)

(72) Inventor: Anna Hosaka, Ibaraki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/822,061

(22) Filed: Aug. 24, 2022

(65) Prior Publication Data
US 2023/0070211 A1    Mar. 9, 2023

(51) Int. Cl.
*H04L 51/02* (2022.01)
*H04L 51/046* (2022.01)
*H04L 51/18* (2022.01)

(52) U.S. Cl.
CPC ............ *H04L 51/02* (2013.01); *H04L 51/046* (2013.01); *H04L 51/18* (2013.01)

(58) Field of Classification Search
CPC ....... H04L 51/02; H04L 51/046; H04L 51/18; H04L 51/04; H04L 51/10; H04L 51/52; Y02D 10/00
See application file for complete search history.

(56) References Cited

U.S. PATENT DOCUMENTS

| | | | | |
|---|---|---|---|---|
| 2019/0317709 | A1* | 10/2019 | Sugimoto | G06F 3/1204 |
| 2020/0097221 | A1* | 3/2020 | Matsumoto | H04L 51/216 |
| 2020/0099800 | A1* | 3/2020 | Noguchi | H04N 1/32662 |
| 2020/0133592 | A1* | 4/2020 | Mitsuhashi | H04L 51/02 |
| 2021/0165616 | A1* | 6/2021 | Yasuda | H04L 51/04 |

FOREIGN PATENT DOCUMENTS

JP    2020154940 A    9/2020

* cited by examiner

*Primary Examiner* — Soe Hlaing
(74) *Attorney, Agent, or Firm* — Canon U.S.A., Inc. IP Division

(57) ABSTRACT

An information processing method includes posting information for inputting an image forming instruction to execute an image forming process based on data uploaded to a channel of a chat service to the channel, causing an image forming apparatus to execute the image forming process based on the data based on the image forming instruction input using the posted information, and determining, based on a state of the image forming apparatus, whether to post the information to the channel.

13 Claims, 15 Drawing Sheets

FIG.11

| MFP NAME | ACCEPTANCE STATE | PRINTER STATE | DETAILED INFORMATION | UPDATE DATE AND TIME |
|---|---|---|---|---|
| 0001 | FALSE | UNKNOWN | OTHER | XXXX/XX/XX XX:XX |
| 0002 | TRUE | OPERATING | — | XXXX/XX/XX XX:XX |
| 0003 | TRUE | IN PROCESS | — | XXXX/XX/XX XX:XX |
| 0004 | FALSE | STOPPED | PLEASE CHANGE MANAGEMENT SETTINGS | XXXX/XX/XX XX:XX |
| 0005 | FALSE | STOPPED | COVER IS OPEN | XXXX/XX/XX XX:XX |
| 0006 | FALSE | STOPPED | TONER HAS RUN OUT | XXXX/XX/XX XX:XX |
| 0007 | FALSE | STOPPED | eMMC REACHES END OF ITS LIFE | XXXX/XX/XX XX:XX |

90 MFP LIST 901 902 903 904 905

INFORMATION PROCESSING METHOD, STORAGE MEDIUM, AND INFORMATION PROCESSING APPARATUS

BACKGROUND

Field

The present disclosure relates to an information processing method, a storage medium, and an information processing apparatus.

Description of the Related Art

Japanese Patent Application Laid-Open No. 2020-154940 discusses an apparatus that runs a chat bot that, in response to a post from a user on a chat service, transmits uploaded image data to a printer and causes the printer to print the image data.

The chat bot discussed in the publication of Japanese Patent Application Laid-Open No. 2020-154940 causes the printer to print the image data based on a particular message (a print instruction) posted by the user in the chat. A configuration is also possible in which, in response to the uploading of image data in the chat, a message for confirming whether to cause the printer to print the image data is displayed. In this case, the user inputs a print instruction in response to the message, whereby the printer prints the uploaded image data.

In a case where, in response to the posting of image data, a message for confirming whether to cause the printer to print the image data is posted in the chat, the following issue can arise. For example, in a case where the message is displayed even in the situation where the printer cannot perform printing, an unnecessary message is displayed.

SUMMARY

In view of the above issue, the present disclosure is directed to preventing unnecessary information from being displayed when, based on the uploading of data to a chat room, information for inputting a print instruction to print the data is displayed.

According to an aspect of the present invention, an information processing method includes posting information for inputting an image forming instruction to execute an image forming process based on data uploaded to a channel of a chat service to the channel, causing an image forming apparatus to execute the image forming process based on the data based on the image forming instruction input using the posted information, and determining, based on a state of the image forming apparatus, whether to post the information to the channel.

Further features will become apparent from the following description of exemplary embodiments with reference to the attached drawings.

BRIEF DESCRIPTION OF THE DRAWINGS

FIG. 11 is a diagram illustrating an example of state information regarding an MFP.

DESCRIPTION OF THE EMBODIMENTS

Exemplary embodiments for carrying out the present disclosure will be described with reference to the drawings. The configurations illustrated in the following exemplary embodiments are merely examples, and the present disclosure is not limited to the configurations illustrated in the figures.

Figure 1:
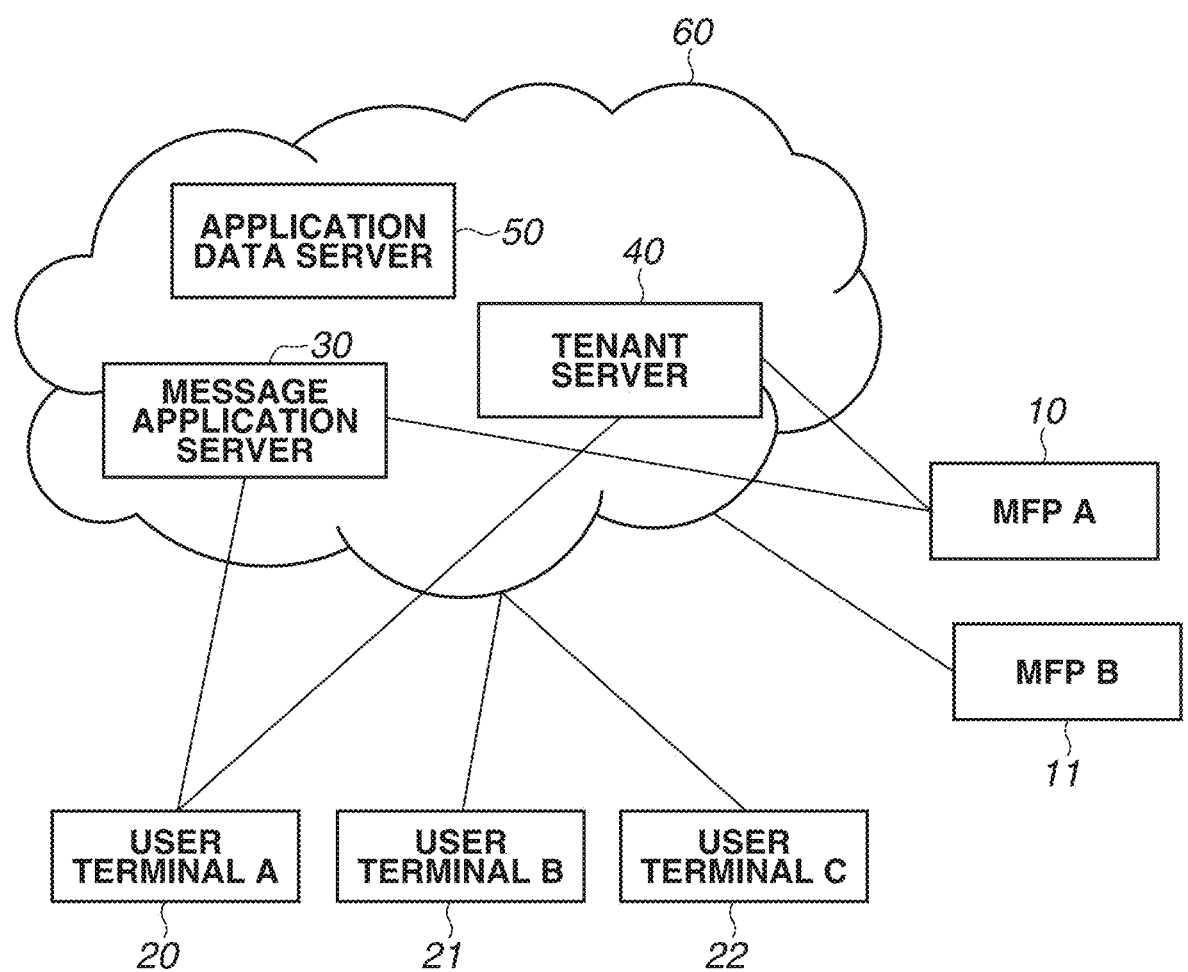
FIG. 1 is a diagram illustrating an example of a system configuration.

FIG. 1 is a diagram illustrating an example of the system configuration of the present invention. In a message application service, a client side includes multifunction peripherals (MFPs) A 10 and A 11, which are image processing apparatuses or image forming apparatuses, and user terminal A 20, user terminal B 21, and user terminal C 22. A server side includes a message application server 30, a tenant server 40, and an application data server 50.

Both MFP A 10 and MFP B 11 include the function of printing an image received from the message application server 30, or the function of transmitting image data generated by scanning an image to the message application server 30. Although FIG. 1 illustrates, as an example, a case where two MFPs are connected, any number of MFPs can be connected. Since the MFP A 10 and the MFP B 11 have the same configuration, for description purposes, only the MFP A 10 will be described below.

Each of the user terminal A 20, user terminal B 21, and user terminal C 22 represent an information processing apparatus such as a smartphone, a tablet terminal, or a personal computer used by a user of the message application service. While FIG. 1 illustrates, as an example, a case with three user terminals, any number of user terminals that would enable implementation of the present embodiment is applicable. The user operates any the user terminal A 20, user terminal B, or user terminal C 22, to access the message application server 30 in a cloud 60. Then, the user exchanges messages with another user or executes an installed application. User terminal A 20, user terminal B 21, and user terminal C 22 and the message application server 30 are connected to a wired or wireless communication network so that the user terminal A 20, user terminal B 21, and user terminal C 22 and the message application server 30 can transmit and receive data to and from each other. In the present exemplary embodiment, a public line on the Internet is assumed as an example of the communication network. In another exemplary embodiment, a secure line can be used. Since user terminal A 20, user terminal B 21, and user terminal C 22 can have the same configuration, for description purposes, only user terminal A 20 is described below.

The message application server 30 is a cloud server placed in the cloud 60 and provides a service using a message application 306. The message application server 30 executes overall processing regarding the exchange of messages, such as the process of transmitting and receiving messages and image data to and from user terminal A and the display of a screen for a chat room. The message application server 30 can process the exchange of messages between two members and can also form a group of three or more members and process the exchange of messages in the group.

The tenant server 40 is a cloud server in the cloud 60 and stores and provides pieces of tenant information. The details of the tenant information stored in the tenant server 40 will be described with reference to items in FIG. 7.

The application data server 50 is a cloud server in the cloud 60 and stores data on a cooperative application A 506 that can be installed on the message application 306. In the present exemplary embodiment, a configuration is implemented where application data is stored in the application data server 50. Alternatively, a configuration can be implemented where data on the cooperative application A 506 is downloaded from a network external to the cloud 60.

Figure 2:
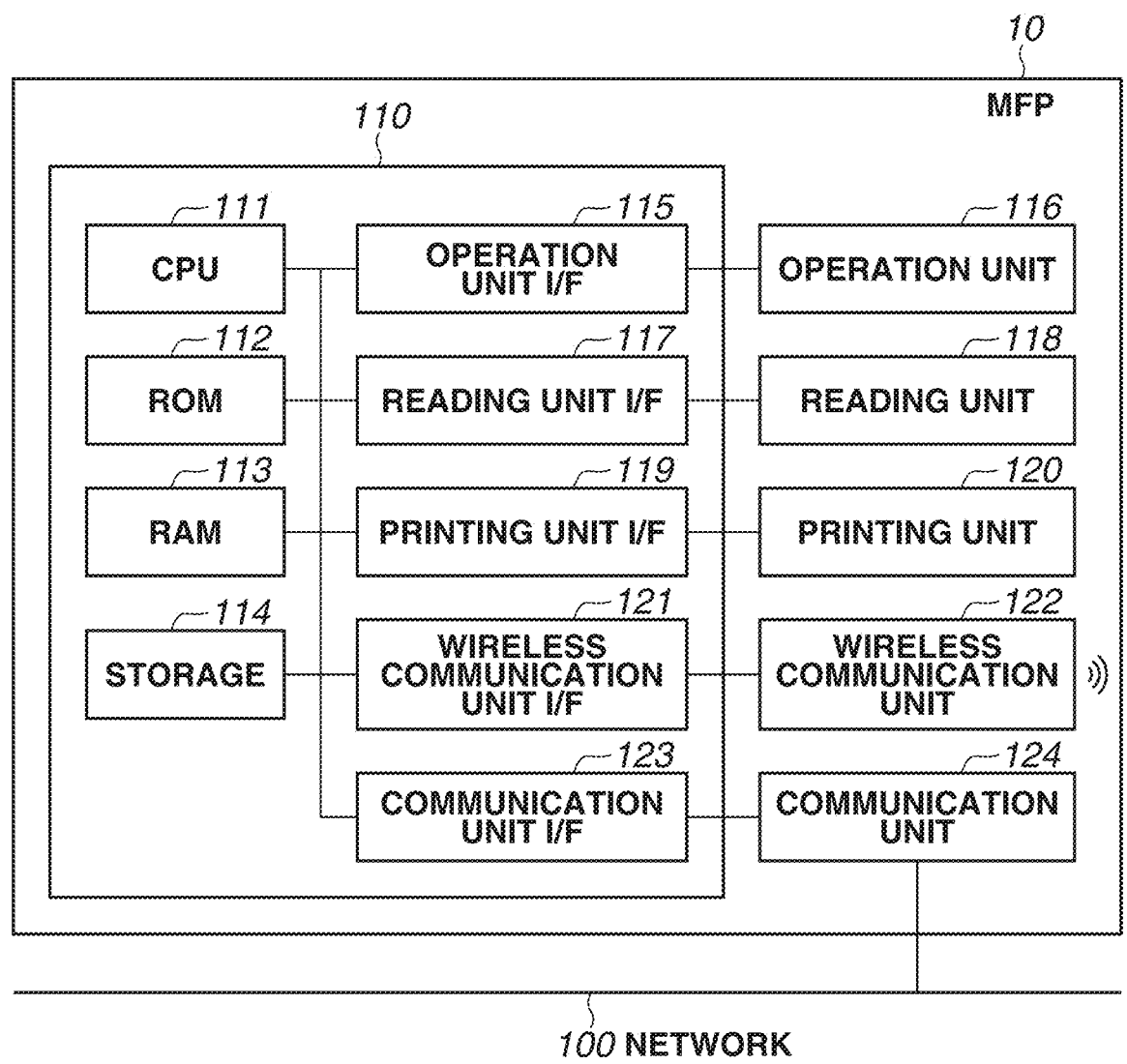
FIG. 2 is a diagram illustrating an example of a hardware configuration of a multifunction peripheral (MFP).

FIG. 2 is a diagram illustrating an example of the hardware configuration of the MFP A 10. The MFP A 10 includes a central processing unit (CPU) 111, a read-only memory (ROM) 112, a random-access memory (RAM) 113, storage 114, an operation unit interface (I/F) 115, and an operation unit 116. The MFP A 10 includes a reading unit I/F 117, a reading unit 118, a printing unit I/F 119, a printing unit 120, a wireless communication unit I/F 121, a wireless communication unit 122, a communication unit I/F 123, and a communication unit 124.

A control unit 110 including the CPU 111 controls the operation of the MFP A 10. The CPU 111 loads control programs stored in the ROM 112 or the storage 114 into the RAM 113 and performs various types of control such as reading control and print control (image forming control). The ROM 112 stores control programs that can be executed by the CPU 111. The ROM 112 also stores a boot program and font data. The RAM 113 is a main storage memory and is used as a work area or a temporary storage area into which various control programs stored in the ROM 112 and the storage 114 are loaded. The storage 114 stores image data, print data, various programs, various addresses, and various pieces of setting information. In the present exemplary embodiment, a flash memory is assumed as the storage 114. Alternatively, an auxiliary storage device such as a solid-state drive (SSD) or a hard disk drive (HDD) can be used. An embedded MultiMediaCard (eMMC) can be used.

In the MFP A 10 according to the present exemplary embodiment, a single CPU 111 executes processes illustrated in a flowchart described below, using a single memory (the RAM 113). This configuration is not seen to be limiting. In another exemplary embodiment, a plurality of CPUs, RAMs, ROMs, and storage locations can cooperate to execute the processes illustrated in the flowchart described below. In another exemplary embodiment, some of the processes can be executed using a hardware circuit such as an application-specific integrated circuit (ASIC) or a field-programmable gate array (FPGA).

The operation unit I/F 115 connects the operation unit 116 including a display unit such as a touch panel and a hardware key to the control unit 110. The operation unit 116 displays a screen and receives an input from the user.

The reading unit I/F 117 connects the reading unit 118 such as a scanner to the control unit 110. The reading unit 118 reads an image of a document, and the CPU 111 converts the read image into image data such as binary data. The image data generated based on the image read by the reading unit 118 is transmitted to an external apparatus or printed on a sheet.

The printing unit I/F 119 connects the printing unit 120 such as a printer to the control unit 110. The CPU 111 transfers image data (print data) stored in the RAM 113 to the printing unit 120 via the printing unit I/F 119. The printing unit 120 prints an image based on the transferred image data on a sheet fed from a sheet feeding cassette (not illustrated).

The wireless communication unit I/F 121 is an I/F for controlling the wireless communication unit 122 and wirelessly connects the control unit 110 and an external wireless device. A configuration can be implemented where the user terminal A 20 is used as an external wireless device.

The communication unit I/F 123 is an I/F for controlling the communication unit 124 and is connected to the control unit 110 and the communication unit 124. The communication unit 124 transmits image data and various pieces of information to an external apparatus on a network 100 or receives print data and information on the network 100 from an information processing apparatus on the network 100. As the transmission/reception method via the network 100, the transmission and the reception can be performed using electronic mail (email), or a file can be transmitted using another protocol (e.g., the File Transfer Protocol (FTP), Server Message Block (SMB), or Web Distributed Authoring and Versioning (WebDAV)). Image data and various pieces of setting data can also be transmitted and received via the network 100 via access from the user terminal A 20 or the message application server 30 using Hypertext Transfer Protocol (HTTP) communication.

Figure 3:
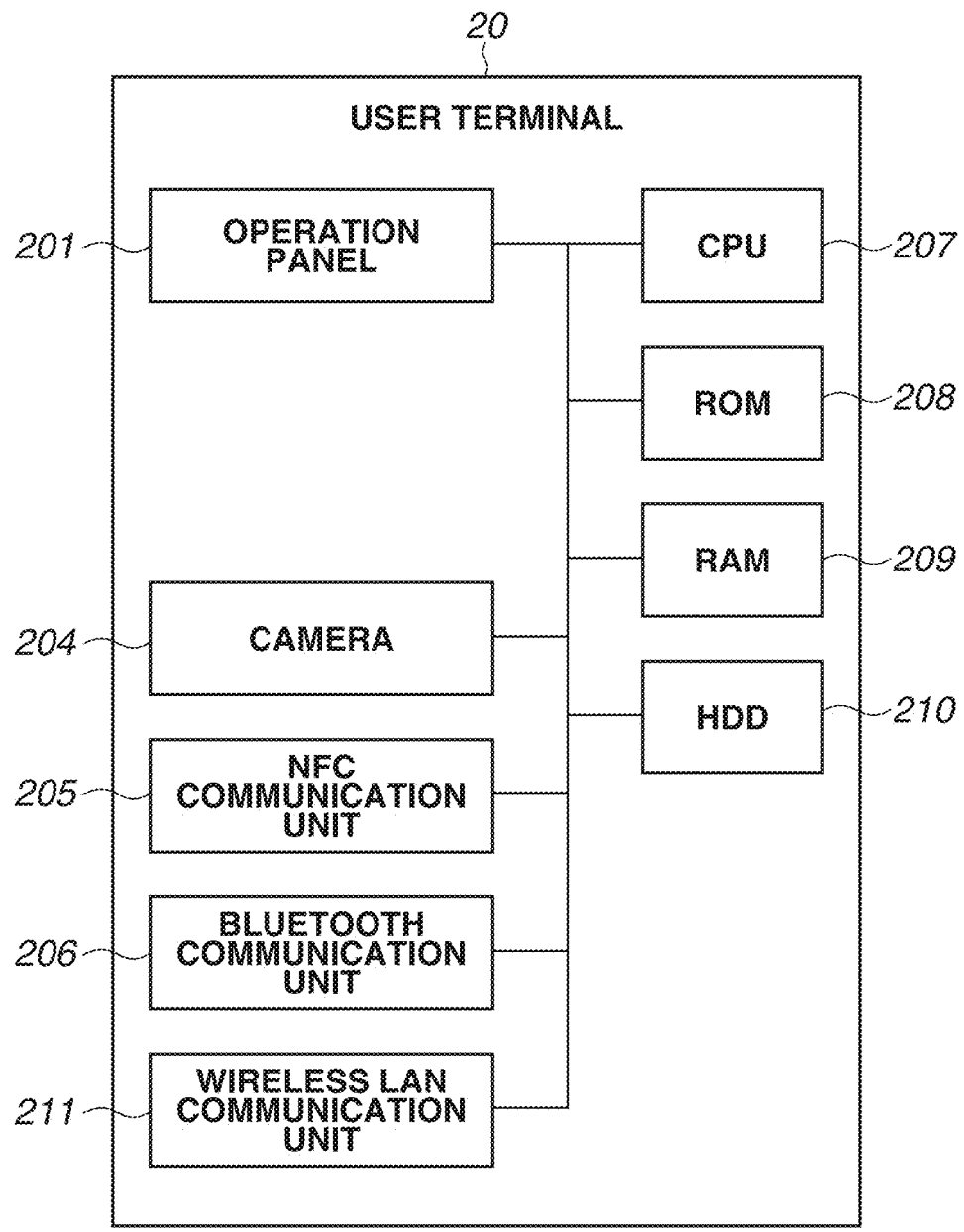
FIG. 3 is a diagram illustrating an example of a hardware configuration of a user terminal.

FIG. 3 is a diagram illustrating an example of the hardware configuration of the user terminal A 20. As the user terminal A 20 according to the present exemplary embodiment, a client terminal as an apparatus such as a smartphone or a tablet personal computer (PC) is assumed.

A CPU 207 reads control programs stored in a ROM 208 and executes various processes for controlling the operation of the user terminal A 20. The ROM 208 stores the control programs. A RAM 209 is used as a temporary storage area such as a main memory or a work area for the CPU 207. An HDD 210 stores various pieces of data associated with images, electronic documents, etc.

An operation panel 201 has a touch panel function capable of detecting a touch operation of the user and displays various screens provided by an operating system (OS) and an electronic mail transmission application. The operation panel 201 is used to confirm information stored in the message application server 30. The user inputs a touch operation to the operation panel 201 to input a desired operation instruction to the user terminal A 20. The user terminal A 20 includes a hardware key (not illustrated), and the user can input an operation instruction to the user terminal A 20 using the hardware key. The user can also connect a keyboard and a mouse to the user terminal A 20 to perform a desired operation.

A camera 204 captures images based on an image capturing instruction from the user. The image captured by the camera 204 is stored in a predetermined area of the HDD 210. The camera 204 can also acquire an image of a Quick Response (QR) Code®, from which a program that can analyze and acquire information from the QR Code®.

The user terminal A 20 can transmit and receive data to and from various peripheral devices via a near-field communication (NFC) communication unit 205, a Bluetooth® communication unit 206, and a wireless local area network (LAN) communication unit 211.

The Bluetooth® communication unit 206 of the user terminal A 20 can be compatible with Bluetooth® Low Energy.

Figure 4:
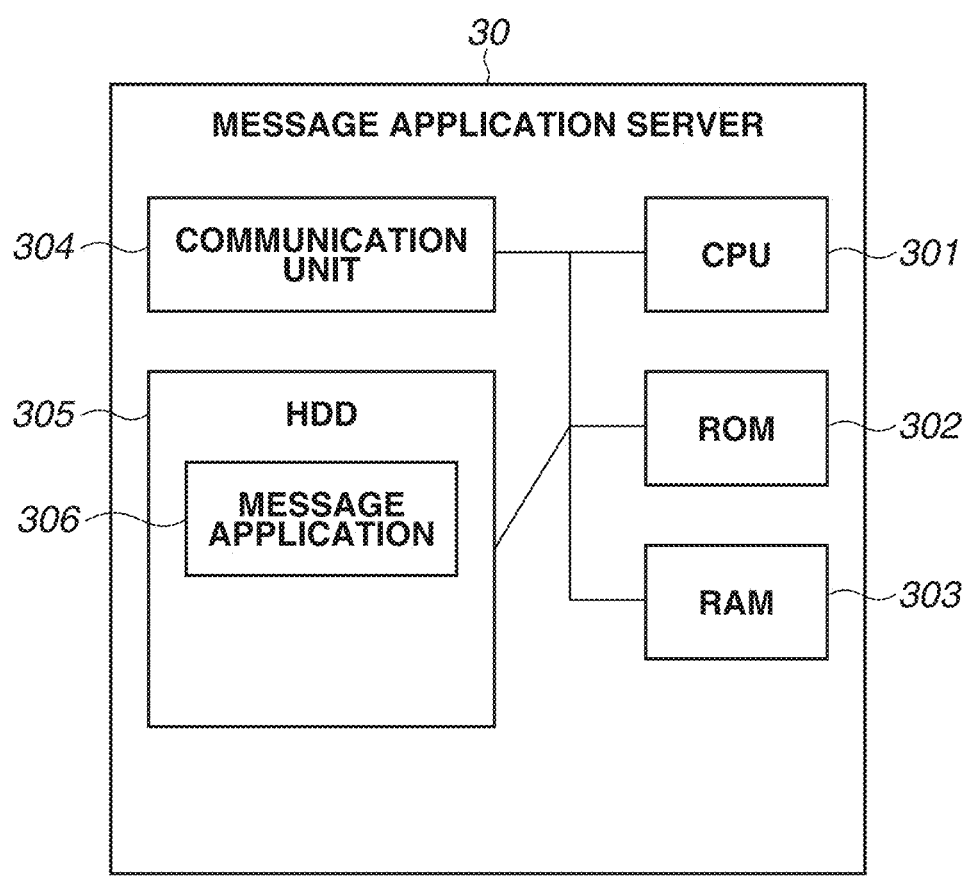
FIG. 4 is a diagram illustrating an example of a hardware configuration of a message application server.

FIG. 4 is a diagram illustrating an example of the hardware configuration of the message application server 30. A CPU 301 reads control programs stored in a ROM 302 and the message application 306 stored in an HDD 305 and executes various processes for controlling the operation of the message application server 30. The ROM 302 stores the control programs. A RAM 303 is used as a temporary storage area such as a main memory or a work area for the CPU 301. The HDD 305 stores various pieces of data on a message, an image, channel information, and an application. The HDD 305 can transmit and receive data to and from various devices such as the user terminal A 20 and the MFP A 10 via a communication unit 304. The communication unit 304 can perform wired communication using Ethernet®, or can perform wireless communication using Wi-Fi®. The message application 306 is installed on the HDD 305 and operates on the CPU 301.

Figure 5:
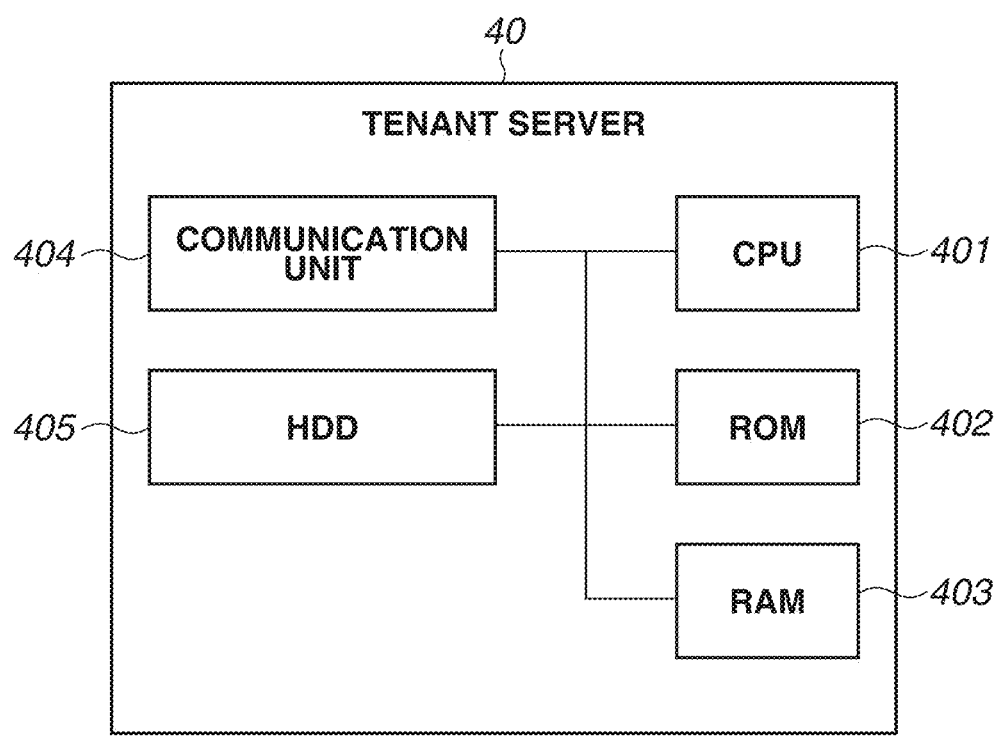
FIG. 5 is a diagram illustrating an example of a hardware configuration of a tenant server.

FIG. 5 is a diagram illustrating an example of the hardware configuration of the tenant server 40. A CPU 401 reads control programs stored in a ROM 402 and executes various processes for controlling tenant information 601. The tenant information 601 to be saved will be described below. The ROM 402 stores the control programs. A RAM 403 is used as a temporary storage area such as a main memory or a work area for the CPU 401. An HDD 405 stores the tenant information 601. The HDD 405 can transmit and receive data to and from an apparatus such as the message application server 30 via a communication unit 404. The communication unit 404 can perform wired communication using Ethernet®, or can perform wireless communication using Wi-Fi®.

Figure 6:
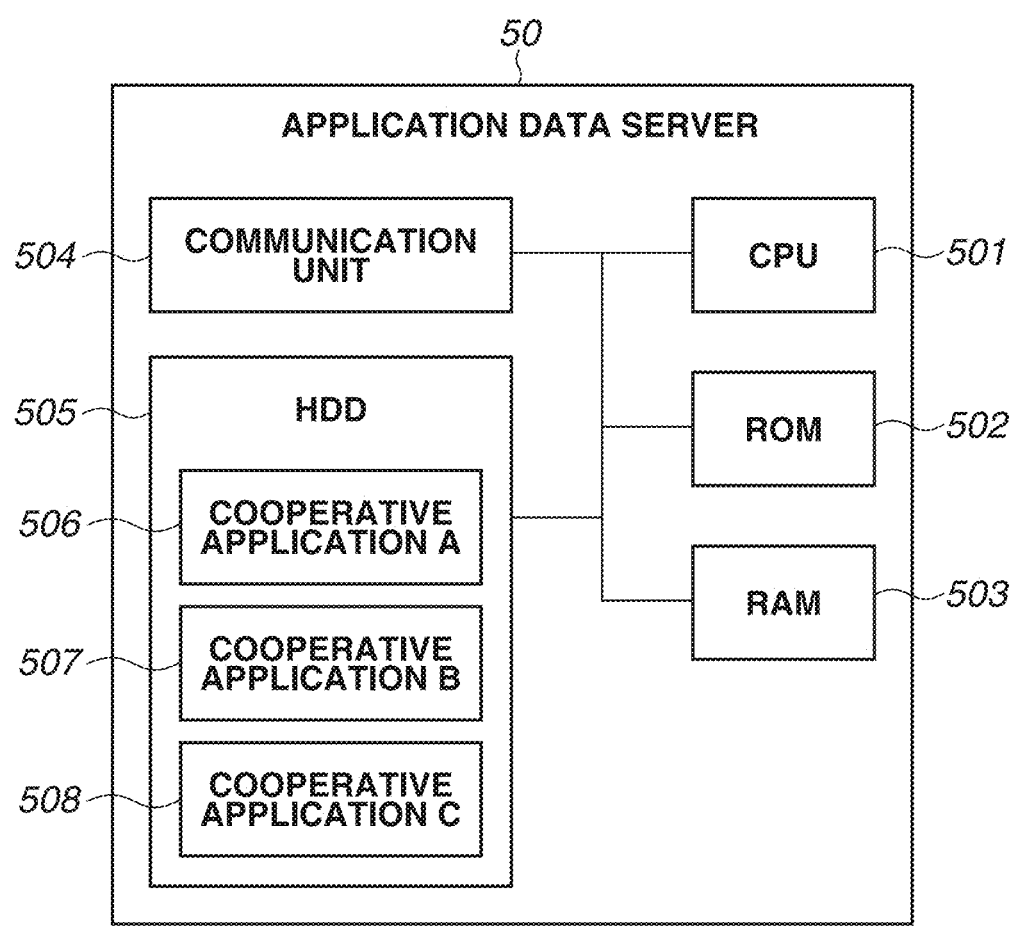
FIG. 6 is a diagram illustrating an example of a hardware configuration of an application data server.

FIG. 6 is a diagram illustrating an example of the hardware configuration of the application data server 50.

A CPU 501 reads control programs stored in a ROM 502 and executes various processes for controlling the application data server 50. The ROM 502 stores the control programs. A RAM 503 is used as a temporary storage area such as a main memory or a work area for the CPU 501. An HDD 505 stores data on cooperative application A 506, cooperative application B 507, and cooperative application C 508. A communication unit 504 can transmit and receive data to and from an apparatus such as the message application server 30. Cooperative application A 506, cooperative application B 507, and cooperation application C 508 are applications that operate cooperatively with the message application 306, and are saved in the HDD 505. In response to a command, cooperative application A 506, cooperative application B 507, and cooperative application C 508 are transmitted to the message application server 30 via the communication unit 504 and installed on the message application server 30. At this time, cooperative application A 506, cooperative application B 507, and cooperative application C 508 are installed on the HDD 305 of the message application server 30.

Figure 7:
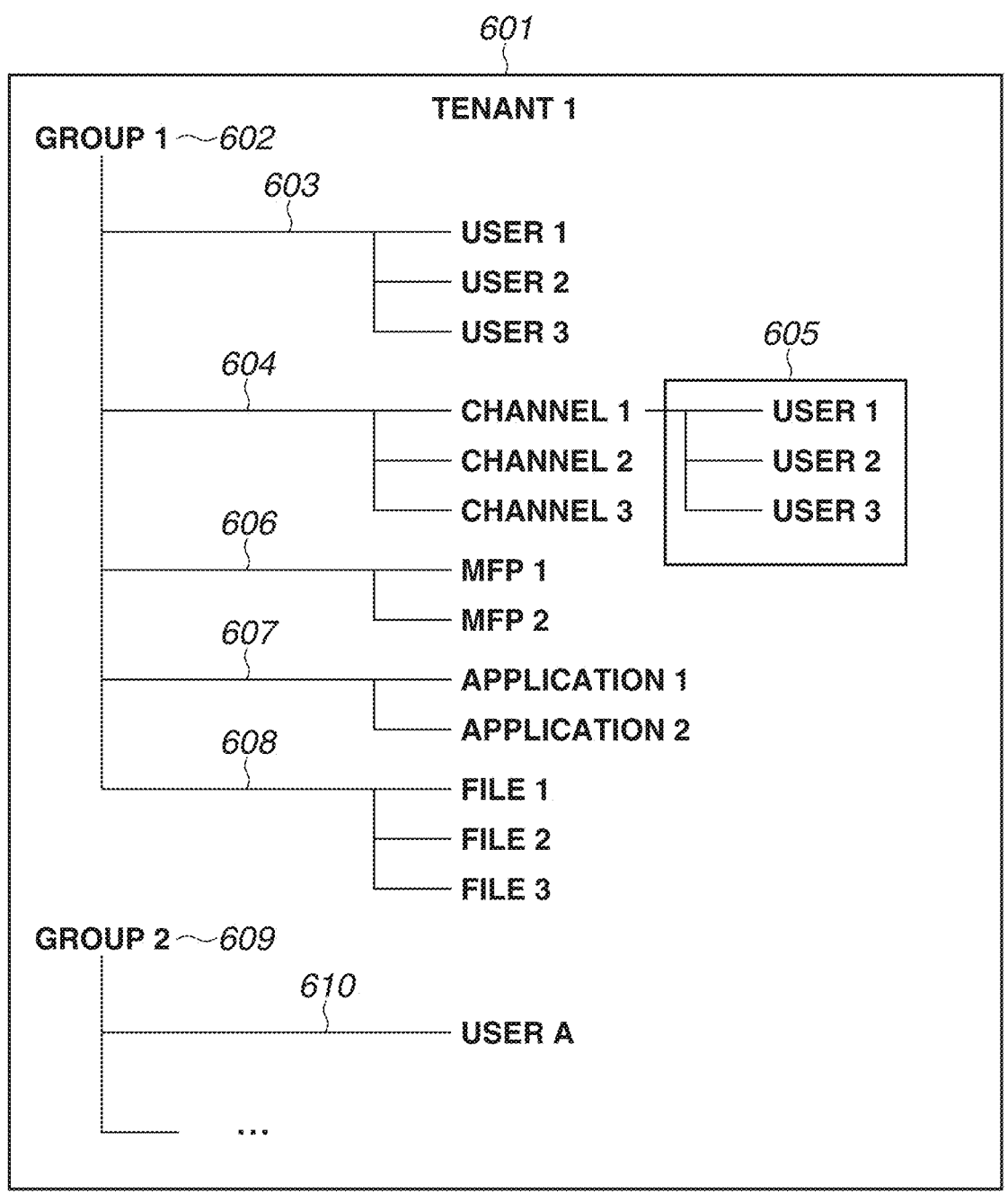
FIG. 7 is a diagram illustrating an example of tenant information stored in the tenant server.

FIG. 7 is a diagram illustrating an example of the tenant information 601 stored in the HDD 405 in the tenant server 40. The tenant information 601 is associated with one or more groups. In the example of FIG. 7, there are two groups, group 1 602 and group 2 609. Depending on the configuration of the message application 306, there is a case where a single piece of tenant information has only a single piece of group information. In this case, the tenant information 601 is equivalent to the group information.

Both group 1 602 and group 2 609 have information that constitute the respective group. Group 1 602 is associated with user information 603, channel information 604, printer information 606, cooperative application information 607, and a file 608.

The user information 603 is information for identifying each user belonging to group 1 602. The channel information 604 is information for grouping the user information 603 and stores a list 605 obtained by putting together pieces of user information 603 corresponding to each channel. On the message application 306, a talk room (a chat room) is generated with respect to each channel indicated by the channel information 604, and a user exchanges messages and image data with another user in the talk room.

The printer information 606 is information for identifying the MFP A 10. The printer information 606 can be the Internet Protocol (IP) address or the media access control (MAC) address of each printer, or can be an identifier (ID) that uniquely identifies the printer. The ID can be an ID issued by the tenant server 40 when information regarding the MFP A 10 is registered in the tenant server 40. An application that uses the information associated with group 1 602 references this information and can send a command such as a print command to any MFP. The printer information 606 is associated with a group, but can be associated with a channel, or can be associated with the cooperative application information 607. For example, a configuration can be implemented where an MFP 1 is associated with an application 1, and the MFP 1 and an MFP 2 are associated with an application 2. The printer information 606 can be associated with the tenant information 601. That is, in the case of a tenant 1 in FIG. 7, printers indicated by the printer information 606 associated in common with the tenant 1 are used. The printer information 606 can be associated with each user indicated by the user information 603. For example, the MFPs 1 and 2 can be associated with a user 1, and the MFP 2 can be associated with a user 2.

The cooperative application information 607 is information for identifying a cooperative application associated with the group 1 602. The cooperative application indicated by the cooperative application information 607 is an application installed on the message application server 30.

The file 608 is a file stored in association with the group 1 602.

For example, the file 608 is transmitted to the MFP A 10, whereby the MFP A 10 can print the file 608. The file 608 is associated with a group, but can be associated with each channel. For example, a certain user posts a file to a channel 1 as a talk room, whereby the file posted to the channel 1 is stored in association with the channel 1. The user can confirm the stored file in the channel 1 or download the stored file to the user terminal A 20.

In a case where a list of users is referenced in the message application 306 corresponding to the tenant information 601, the message application server 30 references information stored in the HDD 405 of the tenant server 40 via the communication unit 304. The information referenced at this time lists the group information 602 and the user information 603. The same applies to the channel information 604, the printer information 606, the cooperative application information 607, and the file 608.

Figure 8:
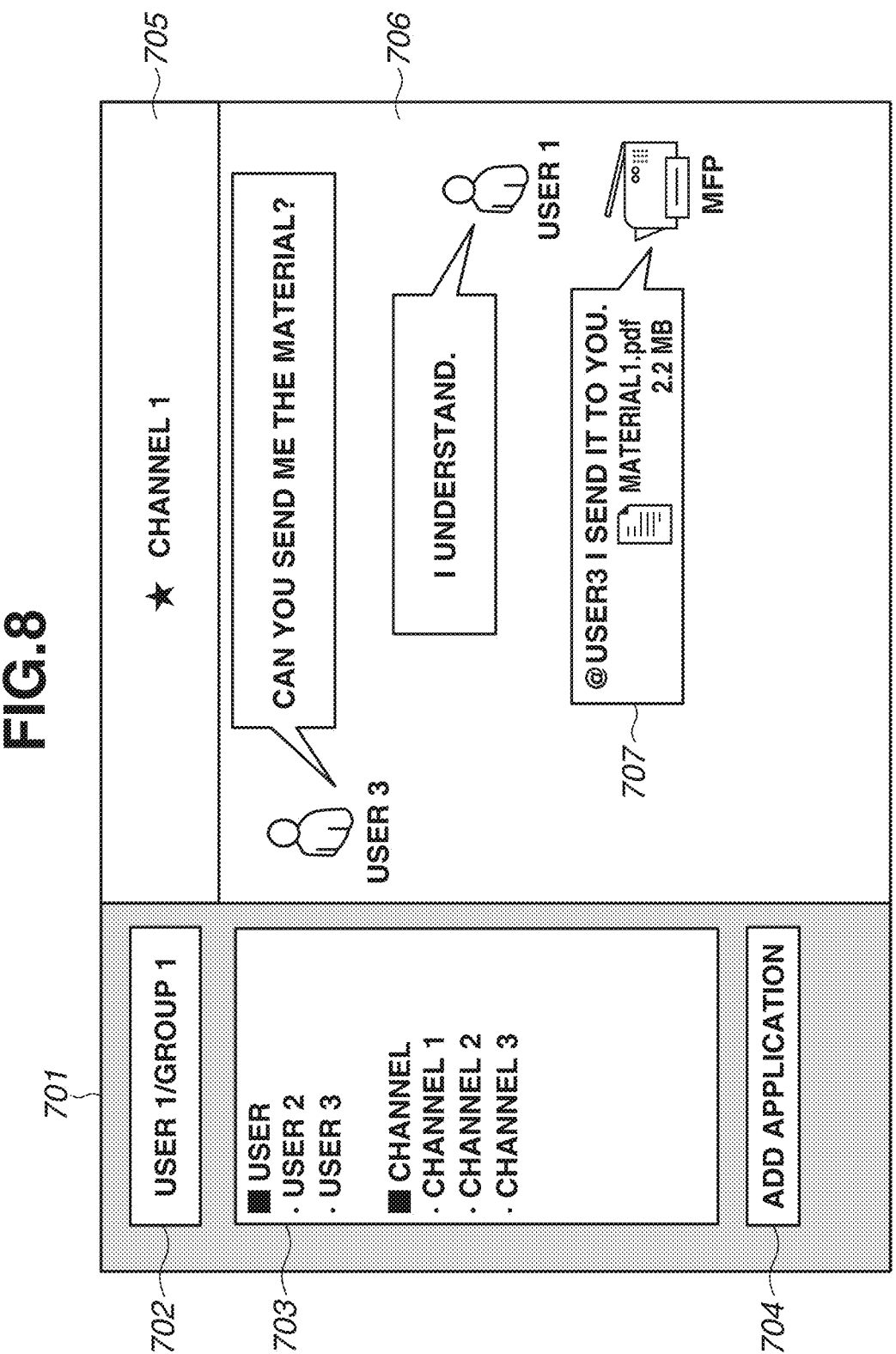
FIG. 8 is a diagram illustrating an example of a message screen displayed on an operation panel of the user terminal.

FIG. 8 is a diagram illustrating an example of a message screen displayed on the operation panel 201 of the user terminal A 20. A message screen 701 is displayed as described below. The message application server 30 executes the message application 306 corresponding to the group 602, whereby screen data is transmitted to the user terminal A 20. Then, the user terminal A 20 displays the message screen 701 based on the screen data.

The message screen 701 illustrates a case where the user 1 accesses the message application 306 associated with the group 602.

A display region 702 displays the user information 603 regarding the user 1 and the group information 602 regarding the group 1 602 to which the user 1 belongs.

A display region 703 displays the user information 603 regarding other users (information regarding other users belonging to group 1 602) and the channel information 604 (information regarding channels generated in group 1 602) that are associated with the group 1 602 information. The user 1 selects any partner in the display region 703, whereby a message screen for exchanging messages with the selected partner is displayed. Thus, the user 1 can exchange messages with the selected partner. In a case where the user 1 selects the channel information 604 in the display region 703, the message screen 701 for exchanging messages with all members belonging to each channel is displayed. In this way, the user 1 can exchange messages with all the members.

A button 704 enables adding the cooperative application A 506. The button 704 is selected, whereby the cooperative application A 506 is installed.

While a configuration is implemented where the cooperative application A 506 is installed in the present exemplary embodiment, a list of other cooperative applications can be displayed, and the user 1 can be allowed to select a cooperative application to be installed.

A display region 705 indicates a partner with which the user 1 is currently exchanging messages. In other words, the display region 705 displays a partner selected in the display region 703. The channel 1 is selected on the message screen 701.

The history of exchanged messages is displayed in messages 706 and 707. Only characters can be displayed as illustrated in the message 706, or information regarding the file 608 can be added as illustrated in the message 707. The display contents are displayed in the message 707 when a file is scanned by and uploaded from the MFP A 10.

Figure 9:
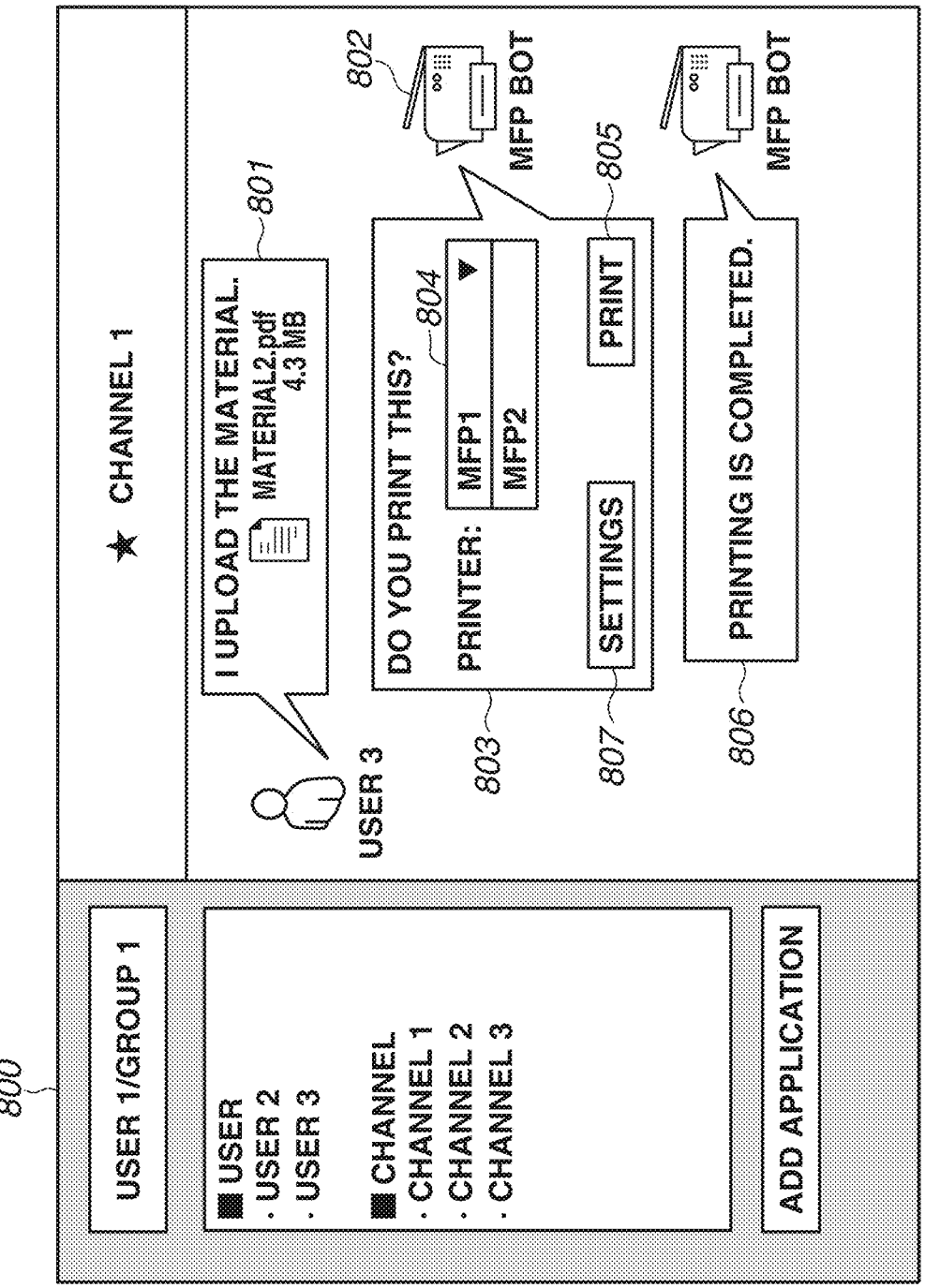
FIG. 9 is a diagram illustrating an example of a message screen displayed on the operation panel of the user terminal.

FIG. 9 is a diagram illustrating an example of a message screen displayed on the operation panel 201 of the user terminal A 20. A message screen 800 illustrates a case where the user 1 accesses the message application 306 associated with the group 1 602.

A message 801 is a message when a user 3 uploads a material and posts text "I upload the material".

An icon 802 is an icon of an MFP bot application installed in association with the channel 1. The MFP bot application is an example of the cooperative application A 506.

A message 803 is a message posted by the MFP bot application after detecting that a file is uploaded in the message 801.

A list 804 indicates a list of printers that can perform printing, and the user 1 selects, from the list, a printer to which the user 1 provides a print instruction.

A button 805 is a print button for providing the print instruction to the printer selected from the list 804. When the button 805 is selected, the MFP bot application transmits the file uploaded in the message 801 and the print instruction to the printer selected from the list 804. The print instruction includes print setting information set by selecting a button 807. Based on the print instruction, the printer upon receipt of the file and the print instruction prints an image based on the received file (image data) on a sheet.

The button 807 is a button for making a print setting. The button 807 is selected, whereby a print setting screen (not illustrated) is displayed and a print setting made by an operation of the user 1 can be received.

A message 806 is a message indicating that the printing executed by selecting the button 805 is completed. The message 806 is a message posted by the MFP bot application based on the message application server 30 receiving a printing completion notification from the printer to which the MFP bot application has transmitted the file and the print instruction.

In the example of FIG. 9, an example has been described where the user 1 selects the displayed button 805 and thereby can provide a print instruction to a printer. This implementation is not seen to be limiting. In another exemplary embodiment, the MFP bot application detects that a file is uploaded. Then, the MFP bot application posts a message "Do you print this?". The user 1 posts a message "Print" in response to the message, whereby the MFP bot application transmits the file and a print instruction to a registered printer. The user returns a message "Print using the MFP 1" in response to the message "Do you print this?" and thereby can select a printer to which the user transmits the file and the print instruction and that prints the file.

As described, the MFP bot application detects the upload of a file by a user. As illustrated in the message 707 in FIG. 8, the MFP bot application can also detect that a file generated by an MFP scanning an image is uploaded by the MFP or a cooperative application that cooperates with the MFP.

Figure 10:
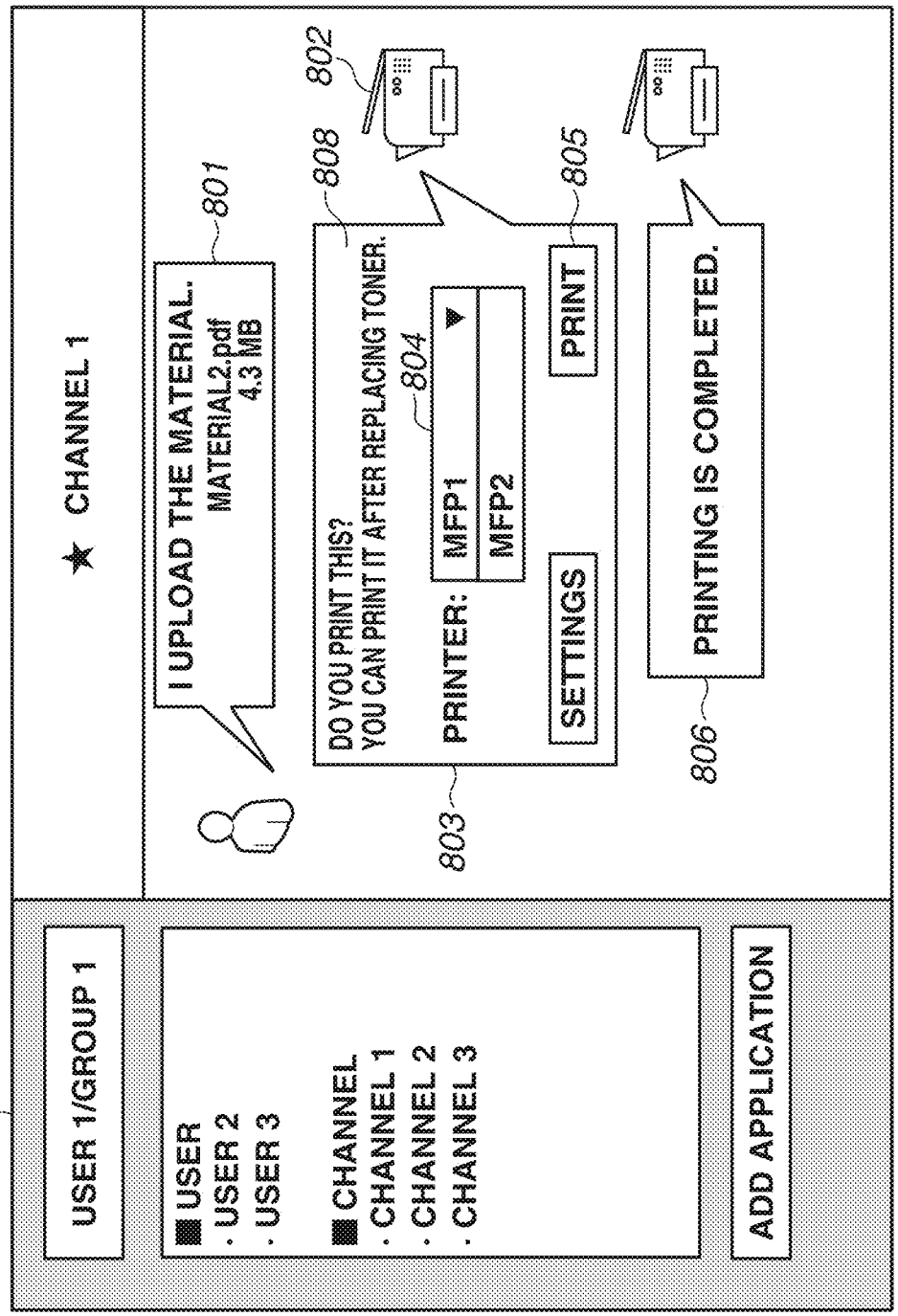
FIG. 10 is a diagram illustrating an example of a message screen displayed on the operation panel of the user terminal.

FIG. 10 is a diagram illustrating an example of a message screen displayed on the operation panel 201 of the user terminal A 20, similar to FIG. 9. A message 803 is a message posted by the MFP bot application after detecting that a file is uploaded in the message 801. In addition to the contents of the message 803 in FIG. 9, a recovery method for the user to recover each MFP is described.

FIG. 11 is a diagram illustrating an example of state information regarding an MFP. The state information is information, which is provided to the tenant server 40 and that is updated every time the state of the MFP registered in the tenant server 40 is changed. An MFP list 90 is a list of MFPs stored in the HDD 405 of the tenant server 40 and includes information described below.

An MFP name 901 is the name of an MFP. An acceptance state 902 is an example of information that can be confirmed when the cooperative application A 506 acquires the state of the MFP registered in the tenant server 40. It can be determined based on the acceptance state 902 whether the MFP can accept a new job. In a case where the acceptance state 902 is false, this indicates that the MFP cannot accept a job. In a case where the acceptance state 902 is true, this indicates that the MFP can accept a job.

A printer state 903 is an example of information that can be confirmed when the cooperative application A 506 acquires the state of the MFP registered in the tenant server 40. For example, in a case where a network cable is not connected to the MFP or the MFP is turned off, the MFP cannot communicate with the tenant server 40. For this reason, the printer state 903 is "unknown".

Detailed information 904 is an example of an item that can be confirmed when the cooperative application A 506 acquires detailed state information regarding the MFP registered in the tenant server 40 in a case where the printer state 903 is other than "operating" or "in process". An update date and time 905 indicates the update date and time of the state information regarding the MFP.

While not illustrated, in the MFP list 90, each MFP is associated with user information regarding a user allowed to use the MFP. The MFP and the user information are associated with each other in the tenant server 40 by the user.

Figure 12:
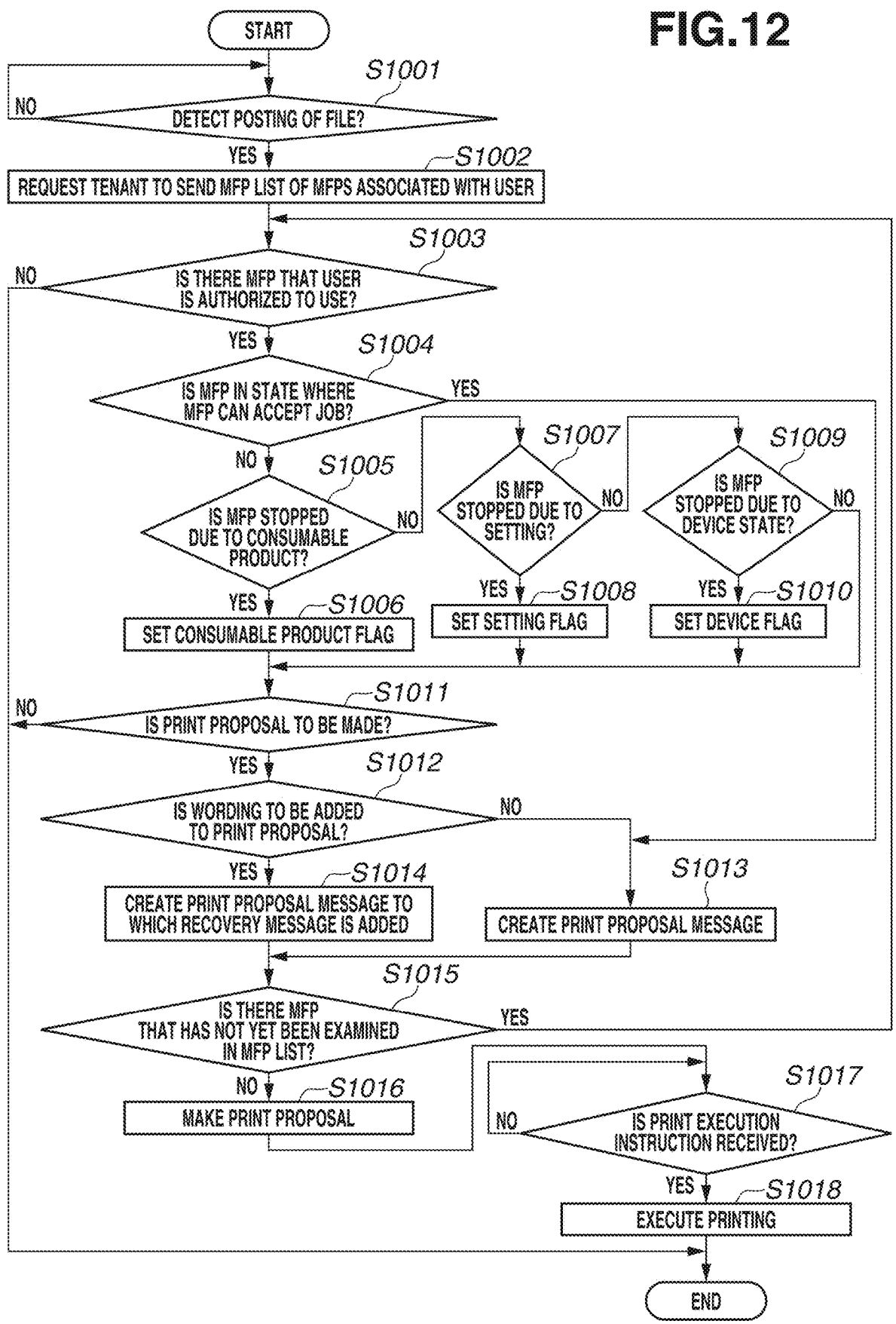
FIG. 12 is a flowchart illustrating an example of a print proposal process by a cooperative application.

FIG. 12 is a flowchart illustrating an example of a print proposal process performed by the cooperative application A 506. The flowchart illustrates the processing of the message application server 30 in FIG. 13. The flow in FIG. 12 is started in a case where the user 1 accesses the message application server 30 using the user terminal A 20 and the message application server 30 receives a request to display a message screen. The flow in FIG. 12 is executed in a case where the CPU 301 of the message application server 30 executes the message application 306 and the cooperative application A 506 stored in the ROM 302 or the HDD 306.

In the following example, an example is described where the cooperative application A 506 is associated with a channel. The flow in FIG. 12 is independently executed with respect to each user belonging to the channel associated with the cooperative application A 506. In the following example, a case is described where the user 1 accesses and logs into the message application server 30 using the user terminal A 20, and the message application server 30 receives a request to display a message screen corresponding to the user 1. Accordingly, a target user in the following description is the user 1. In a case where the message application server 30 receives a request to display a message screen from another user (the user 2 or 3), the flow in FIG. 12 is independently started.

The flow in FIG. 12 is started in a case where the CPU 301 of the message application server 30 first executes the cooperative application A 506 and the cooperative application A 506 then causes the message application server 30 to execute processes.

In step S1001, the cooperative application A 506 determines whether there is a change in a file in the message application server 30. In a case where a change in a file is not detected (NO in step S1001), the processing remains in step S1001. In a case where a change in a file is detected (YES in step S1001), the processing proceeds to step S1002. In other words, the cooperative application A 506 determines whether a file is uploaded to the channel associated with the cooperative application A 506. In a case where a file is uploaded, the processing proceeds to step S1002. If not, the processing remains in step S1001. The process of step S1001 can be performed not in a case where the posting of a file is detected but in a case where the posting of a message requesting a print proposal from the user 1 is detected. As an example, in a case where a message "Print" from the user 1 is detected, the processing proceeds to step S1002. If not, the processing remains to step S1001.

In step S1002, the cooperative application A 506 requests the tenant server 40 to send the MFP List 90 of MFPs associated with the user 1 having transmitted the request for the message screen. That is, the message application server 30 transmits a request for the MFP List 90 to the tenant server 40.

In step S1003, the cooperative application A 506 determines whether there is an MFP registered in advance in association with the user 1 having transmitted the request to display the message screen. That is, the cooperative application A 506 determines whether there is an MFP with which the user information 603 regarding the user 1 is associated from among the MFPs included in the MFP List 90 received in step S1002. In a case where there is no MFP that the user 1 is authorized to use from among the MFPs associated with the user 1 (NO in step S1003), a print proposal message is not posted to the channel and the processing of the cooperative application A 506 ends. In a case where there is an MFP that the user is authorized to use (YES in step S1003), the processing proceeds to step S1004.

By executing such a process, it is possible to prevent the display of a message for confirming whether to cause a printer to perform printing even though there is no printer that a user can use.

In step S1004, the cooperative application A 506 confirms the acceptance state 902 in the MFP List 90 acquired in step S1002. In a case where the acceptance state 902 is true (the MFP can accept a job) (YES in step S1004), the processing proceeds to step S1013. In a case where the acceptance state 902 is false (the MFP cannot accept a job) (NO in step S1004), the processing proceeds to step S1005. That is, in a case where the MFP associated with the user 1 having transmitted the request to display the message screen is in the state where the MFP can accept a job, the processing proceeds to step S1013. If not, the processing proceeds to step S1005. The state where the MFP can accept a job is the state where the cooperative application A 506 can transmit the file and a print instruction to the MFP. MFPs displayed in the list 804 are MFPs associated with a user accessing the message application server 30 using the user terminal A 20 to display the message 803. In other words, MFPs displayed in the list 804 can differ with respect to each user who displays the message 803. The user and MFPs are registered in advance in association with each other in the tenant server 40. MFPs near the user are typically set as the MFPs to perform printing.

The state information regarding each MFP may not be included in the MFP list 90 received in step S1002. For example, the cooperative application A 506 can communicate with an MFP included in the MFP List 90 received in step S1002 and directly receive the state information from the MFP.

The order of steps S1003 and S1004 can be changed. Examples of the order include the order in which it is determined whether the state of each MFP registered in the message application server 30 is the state where the MFP can accept a job. Then, it is determined whether the user 1 having transmitted the request for the message screen via the application server 30 is authorized to use the MFP for which the determination has been made. The order of the present exemplary embodiment is not limiting and any order that would enable implementation of the exemplary embodiment is applicable.

In step S1005, based on the detailed information 904 regarding the MFP, the cooperative application A 506 confirms whether the cause of the state where the MFP cannot accept a job is an event related to a consumable product. In a case where the cause is an event related to a consumable product (YES in step S1005), the processing proceeds to step S1006. In a case where the cause is an event unrelated to a consumable product (NO in step S1005), the processing proceeds to step S1007. In another exemplary embodiment, the process of step S1005 can be omitted. Examples of the event related to a consumable product include the state where toner is insufficient, the state where ink has run out, and the state where it is detected that a medium does not match the MFP.

In step S1006, since the cause of the state where the MFP cannot accept a job is the event related to a consumable product, the cooperative application A 506 sets a consumable product flag.

In step S1007, the cooperative application A 506 confirms whether the cause of the state where the MFP cannot accept a job is an event related to the setting of the MFP based on the detailed information 904 regarding the MFP. In a case where the cause is an event related to the setting of the MFP (YES in step S1007), the processing proceeds to step S1008. In a case where the cause is an event unrelated to the setting of the MFP (NO in step S1007), the processing proceeds to step S1009. In another exemplary embodiment, the process of step S1007 can be omitted. Examples of the event related to the setting include the state where a setting is made so that administrator authority is required to execute a job.

In step S1008, since the cause of the state where the MFP cannot accept a job is the event related to the setting of the MFP, the cooperative application A 506 sets a setting flag.

In step S1009, the cooperative application A 506 confirms whether the cause of the state where the MFP cannot accept a job is an event related to the device main body of the MFP based on the detailed information 904 regarding the MFP. In a case where the cause is an event related to the device main body of the MFP (YES in step S1009), the processing proceeds to step S1010. In a case where the cause is an event unrelated to the device main body of the MFP (NO in step S1009), the processing proceeds to step S1011. In another exemplary embodiment, the process of step S1009 can be omitted. Examples of the event related to the device main body include the state where a cover is open.

In step S1010, since the cause of the state where the MFP cannot accept a job is the event related to the device main body of the MFP, the cooperative application A 506 sets a device flag.

In step S1011, the cooperative application A 506 determines whether to post a message for a print proposal for the user 1 having transmitted the request for the message screen via the application server 30. A first determination criterion is whether the acceptance state 902 of the MFP is true or false. In a case where the acceptance state 902 is true, the processing proceeds to step S1012 to post the message for the print proposal. A second determination criterion is a case where, even in a case where the acceptance state 902 of the MFP is false, any of the determinations in steps S1005, S1007, or S1009 is YES, i.e., there is a recovery method for the user. In this case, the processing proceeds to step S1012. The recovery method for the user is presumed from the detailed information 904 when the state information regarding the MFP is acquired from the message application server 30. In a case where the first and second determination criteria do not apply, the processing of the cooperative application A 506 ends. Examples of the case where the first and second determination criteria do not apply include a case where the acceptance state 902 of the MFP is false, the detailed information 904 regarding the MFP is "eMMC reaches end of its life", and all of the determinations in steps S1005, S1007, or S1009 are NO, i.e., a case where the user cannot recover the MFP. In a case where the tenant server 40 and the MFP cannot communicate with each other because, for example, a network cable is not connected to the MFP, the state information regarding the MFP cannot be acquired. Also in such a case, the determination in step S1011 is NO. That is, that the state information regarding the MFP cannot be acquired means that a print job cannot be transmitted to the MFP. Accordingly, it is not necessary to make the print proposal.

It can be determined whether to make the print proposal based only on the second determination criterion, without consideration of the first determination criterion. For example, in a case where the flag is set in step S1006, S1008, or S1010, the print proposal can be made. In a case where the state information regarding the MFP is not acquired, the print proposal may not be made.

In the present exemplary embodiment, in a case where it is determined in step S1004 that the acceptance state 902 is false, the print proposal may not be made at any time. In other words, in a case where the operation of the MFP is stopped or in a case where communication cannot be performed via the network 100, information for inputting an image forming instruction to execute an image forming process based on data uploaded to a chat room may not be displayed.

In step S1012, the cooperative application A 506 determines whether wording indicating the recovery method for the user is to be added to the message for the print proposal. The wording is changed according to the content of the detailed information 904 regarding the MFP and the flag processed in step S1006, S1008, or S1010. As an example of the recovery method for the user, the message 808 is displayed. For example, in a case where the remaining amount of toner is low and the consumable product flag is set, a message "Please replace toner" is added. In a case where the setting flag is set, a message "Please review settings" is added. In a case where the device flag is set because a cover provided in the main body of the MFP is open, a message "Please close the cover" is added. The message to be added is determined based on the set flag and the detailed information 904 in the MFP List 90. In another exemplary embodiment, step S1012 can be omitted, and the message may not be added at any time.

In step S1013, the cooperative application A 506 generates the message for the print proposal. As an example of the message to be generated, the message 803 in FIG. 9 is illustrated. In step S1014, the cooperative application A 506 generates the message for the print proposal. As an example, the message 808 in FIG. 10 is illustrated. In a case where a recovery message is added, the recovery message can be displayed by associating the name of an MFP and the recovery message to clarify which MFP corresponds to the recovery message.

In step S1015, the cooperative application A 506 determines whether the processes of step S1003 and the subsequent steps are executed on all the MFPs in the MFP List 90 that the cooperative application A 506 has requested the tenant server 40 to send in step S1002. In a case where the processes of step S1003 and the subsequent steps are executed on all the MFPs described in the MFP List 90 (NO in step S1015), the processing proceeds to step S1016. In a case where there is an MFP on which the processes of step S1003 and the subsequent steps (YES in step S1015) are not executed, the processing returns to step S1003. In another exemplary embodiment, the process of step S1015 can be omitted, and the determination in step S1004 can be made on all the MFPs that can be used by the user 1.

In step S1016, the print proposal message generated in step S1013 or S1014 is posted to the channel. The message application 306 generates screen data for displaying the posted message. The user terminal A 20 having received the screen data displays the message screen based on the screen data. The message for the print proposal can be posted in a setting in which the message is visible only to a particular user in the channel. As an example, the message can be posted in a setting in which the message is visible only to the user 1 having transmitted the request for the message screen via the application server 30.

In step S1017, the cooperative application A 506 determines whether the print button 805 is selected by the user 1. In a case where the print button 805 is selected (YES in step S1017), the processing proceeds to step S1018. In a case where the print button 805 is not selected (NO in step S1017), the cooperative application A 506 continues the process of step S1017 and waits for a user operation.

In step S1018, the cooperative application A 506 selects any MFP from an MFP list described in the print proposal message and executes printing using the selected MFP.

As an example, in a case where the MFP 1 is selected on the screen 800 displayed on the user terminal A 20 in FIG. 9, the cooperative application A 506 transmits a print instruction to the MFP 1. In a case where the cooperative application A 506 receives a printing completion notification from the MFP 1 to which the cooperative application A 506 has transmitted the print instruction, the cooperative application A 506 posts to the message application 306 the message 806 indicating that the printing is completed. The message application 306 generates screen data for displaying the posted message 806. The flow of this process will be described in detail with reference to FIG. 15.

Figure 13:
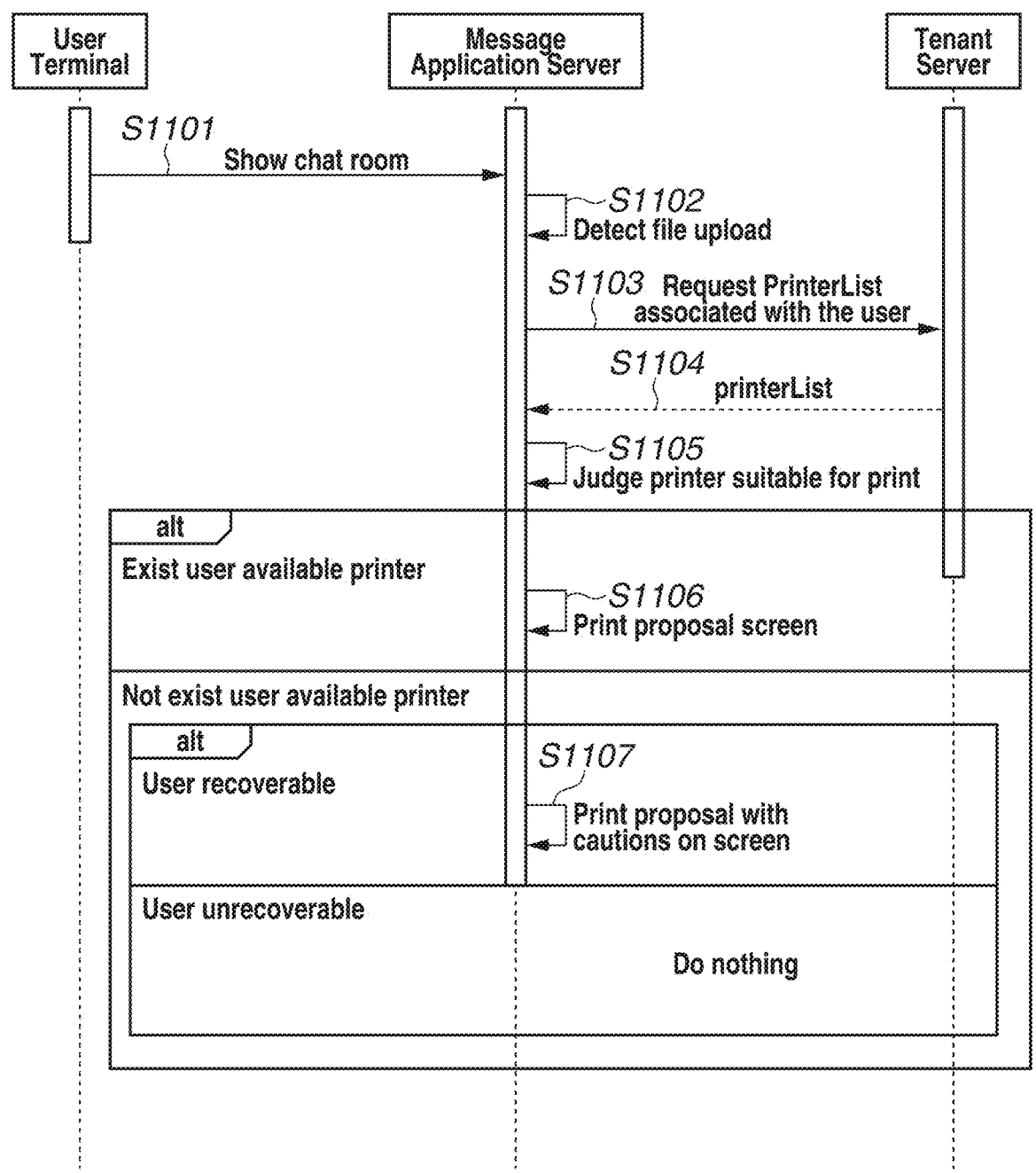
FIG. 13 is a sequence diagram illustrating an example of a process of posting a message for a print proposal.

FIG. 13 is a sequence diagram illustrating an example of the process of posting a message for a print proposal. On the assumption that the cooperative application A 506 installed on the message application server 30 has the function of transmitting a file uploaded from the user terminal A 20 to the MFP A 10 and causing the MFP A 10 to print the file, this function is described.

This sequence illustrates an operation to be performed in a case where the cooperative application A 506 is installed on the HDD 305 in the message application server 30 by performing the sequence illustrated in FIG. 13. The message application server 30 performs the operation of the cooperative application A 506. In the sequence in FIG. 13, all the steps of the message application server 30 are the operation of the cooperative application A 506.

In step S1101, the CPU 207 of the user terminal A 20 transmits a request to display a message screen to the message application server 30 via the wireless LAN communication unit 211. Specifically, the CPU 207 of the user terminal A 20 transmits a request for screen data based on which the user terminal A 20 displays a message screen.

In step S1102, the CPU 301 of the message application server 30 determines whether a file is posted to the channel. This step corresponds to step S1001 in FIG. 12.

In step S1103, in a case where the posting of a file is detected in step S1102, the CPU 301 of the message application server 30 requests the tenant server 40 to send a list of MFPs registered in advance in association with the user having made the request to display the message screen. This corresponds to step S1002 in FIG. 12.

In step S1104, the tenant server 40 sends the list of MFPs that are registered in advance in association with the user having requested the message screen and that the CPU 301 of the message application server 30 has requested in step S1103.

In step S1105, the CPU 301 of the message application server 30 determines whether there is an MFP that can perform printing. This step corresponds to step S1011 in FIG. 12.

Specifically, the CPU 301 of the message application server 30 determines whether the user is authorized to use each MFP in the MFP List 90 acquired in step S1104. Then, in a case where the user is authorized to use the MFP, the CPU 301 of the message application server 30 confirms the acceptance state 902 of the MFP and determines whether the MFP can perform printing. This step corresponds to a case where the determination is YES in step S1003 and the determination is YES in step S1004 in FIG. 12. In a case where it is determined that the MFP cannot perform printing, the CPU 301 of the message application server 30 confirms the detailed information 904 regarding the MFP and determines whether the user can recover from the cause of the state where the printing acceptance state 902 is false. This step corresponds to steps S1005 to S1010 in FIG. 12.

In step S1106, in a case where it is determined in step S1105 that an MFP registered in advance in association with the user is suitable for printing, the CPU 301 of the message application server 30 generates a screen for displaying a message for a print proposal. This step corresponds to step S1014 in FIG. 12.

In step S1107, in a case where it is determined that the recovery method for the user to recover the MFP registered in advance in association with the user exists, the CPU 301 of the message application server 30 generates a screen for displaying a message describing the recovery method for the user in addition to the message for the print proposal. This step corresponds to step S1013 in FIG. 12.

In step S1105, in a case where it is determined that the message for the print proposal should not be posted, the CPU 301 of the message application server 30 generates screen data for not displaying the message for the print proposal. This step corresponds to a case where the determination is NO in step S1003 or the determination is NO in step S1011. The message application server 30 transmits the generated screen data to the user terminal A 20. The user terminal A 20 updates the display on the operation panel 201 based on the received screen data.

Figure 14:
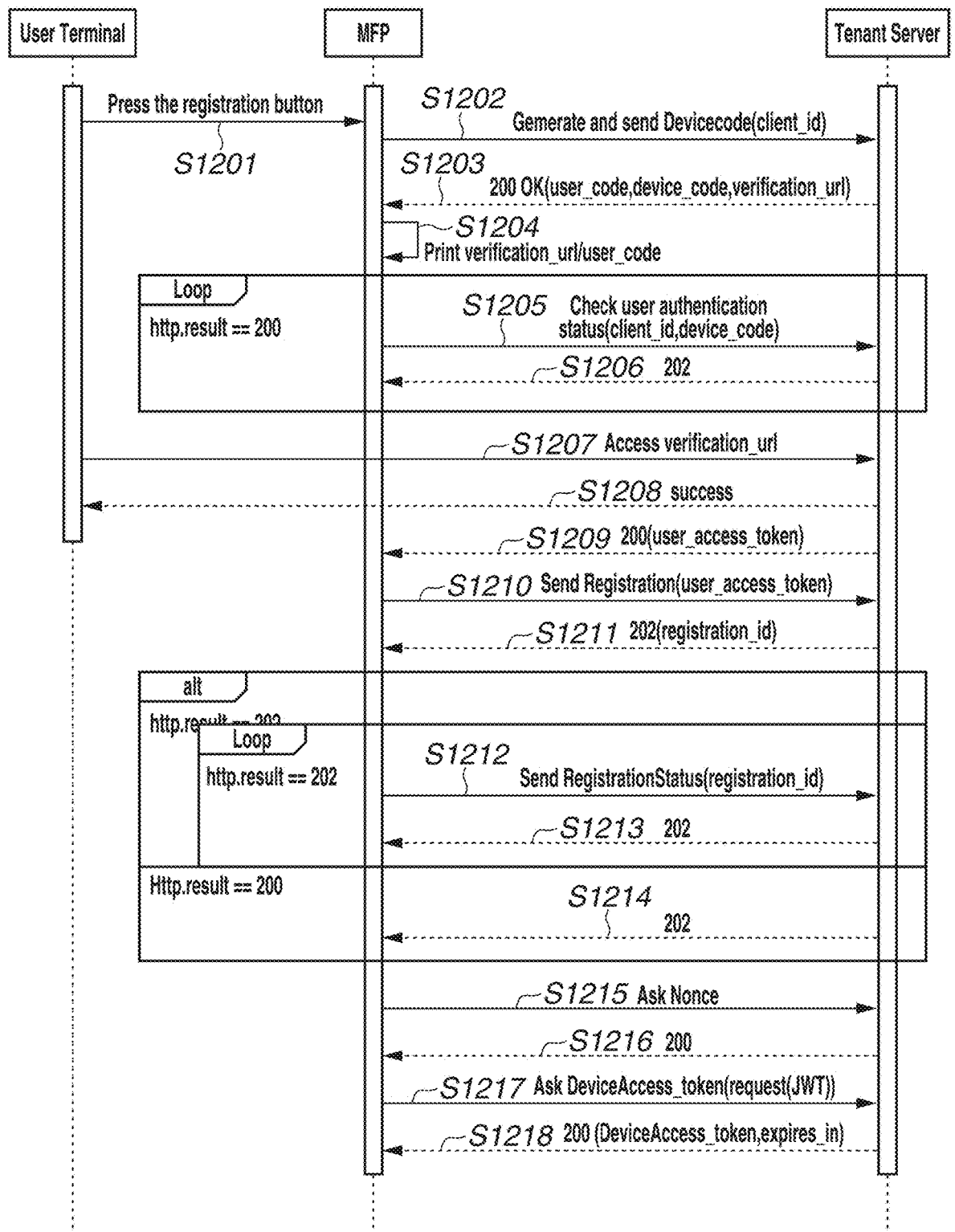
FIG. 14 is a sequence diagram illustrating an example of a registration process for registering an MFP in the tenant server.

FIG. 14 is a sequence diagram illustrating a sequence for registering an MFP in advance in the tenant server 40. In the following example, a case is described where any MFP accesses the tenant server 40 and the MFP is registered in the tenant server 40. Thus, a target user in the following description is the user 1. In a case where an MFP receives a request to register the MFP in the tenant server 40 from another user (the user 2 or 3), the sequence in FIG. 14 is independently started.

In the sequence in FIG. 14, a target user registers an MFP, thereby causing the MFP to execute processes.

In step S1201, an MFP registration button displayed on the user terminal A 20 is selected, and as a result, the sequence for registering an MFP in the tenant server 40 is started. The sequence is broadly divided into three phases, "user authentication", "device registration", and "access token acquisition".

In step S1202, an MFP having received a registration request from the target user generates a unique client ID and transmits the client ID to the tenant server 40. This starts the "user authentication" phase.

In step S1203, in a case where the MFP having transmitted the client ID is not registered in the tenant server 40, the CPU 401 of the tenant server 40 having received the client ID from the MFP receives the registration request and returns a unique user code, a unique device code, and a verification Uniform Resource Locator (URL) to the MFP.

In step S1204, the MFP displays the user code and the verification URL returned from the tenant server 40 in step S1203.

In step S1205, the MFP requests the tenant server 40 to confirm the authentication status until the authentication of the target user is completed. In the confirmation, the MFP transmits the client ID generated in step S1202 and the device code returned in step S1203. The CPU 401 of the tenant server 40 having received the authentication status confirmation request from the MFP returns a reception response 202. Step S1205 is repeatedly performed until an authentication completion response 200 is returned from the tenant server 40 as in step S1209.

In step S1207, the CPU 207 of the user terminal A 20 transmits the authentication information displayed in step S1204 to the tenant server 40 via the wireless LAN communication unit 211.

In step S1208, the CPU 401 of the tenant server 40 having received the user code from the target user confirms whether the received user code is a user code input to the verification URL returned in step S1203. In a case where the confirmation is successful, the CPU 401 of the tenant server 40 notifies the user terminal A 20 that the user authentication is successful. Then, the CPU 401 of the tenant server 40 changes the authentication status of the MFP registered in the tenant server 40 to "registered".

The MFP repeatedly requests the tenant server 40 to confirm the authentication status from step S1205 to the completion of the authentication of the target user. Since the authentication status is changed to "registered" in step S1208, in step S1209, the tenant server 40 returns an authentication completion response 200 and a user access token. This completes the "user authentication" phase. In a case where the user authentication is not successful due to the expiration of the verification URL in the CPU 401 of the tenant server 40, the sequence is started again from step S1201. An example where an MFP is associated with a user is described above. In another exemplary embodiment, an MFP can be associated with group information, or can be associated with channel information. In this case, the CPU 301 of the message application server 30 requests the tenant server 40 to send a list of printers (MFPs) corresponding to the group information or the channel information.

In step S1207, the user inputs authentication information corresponding to tenant data on the user via the operation panel 201 of the user terminal A 20. In this process, authentication information (an ID or a password) input when the user has logged into the message application server 30 can be used. In this case, without the user inputting the authentication information in step S1207, the processing proceeds to step S1210.

In step S1210, the MFP transmits the user access token returned in step S1209 to the tenant server 40 and makes a device authentication request. This starts the "device registration" phase.

In step S1211, the CPU 401 of the tenant server 40 returns a reception response 202 and a unique registration ID to the MFP.

In step S1212, the MFP repeatedly makes a device registration status confirmation request regarding the registration ID returned in step S1211 to the tenant server 40 until a registration success response 200 is returned from the tenant server 40.

In step S1213, the CPU 401 of the tenant server 40 returns a reception response 202 indicating that the device registration status confirmation request is received to the MFP. The CPU 401 of the tenant server 40 returns the reception response 202 until the MFP associated with the registration ID is registered in the tenant server 40.

In step S1214, in a case where the registration of the MFP associated with the registration ID is completed, the tenant server 40 returns a success response 200 in response to the registration status confirmation request from the MFP. This completes the "device registration" phase. In a case where the user authentication is not successful due to the expiration of the user access token in the tenant server 40, the sequence is started again from step S1201.

In step S1215, the MFP requests the tenant server 40 to send a nonce as a one-time password for acquiring an access token for the MFP registered in the tenant server 40. This starts the "access token acquisition" phase.

In step S1216, in a case where the tenant server 40 receives the nonce request, the CPU 401 of the tenant server 40 generates a nonce and returns the nonce to the MFP.

In step S1217, the MFP having received the nonce requests the tenant server 40 to send a device access token, using the registration ID returned in step S1211 and the nonce. The MFP generates a token with an electronic signature termed a JSON (JavaScript Object Notation) Web Token (JWT), which is a key pair, and transmits the JWT to the tenant server 40.

In step S1218, the CPU 401 of the tenant server 40 having received the JWT generates a JWT, which is a key pair for authentication, based on the registration ID of the registered MFP and the nonce generated in step S1216 and confirms whether the generated JWT matches the JWT transmitted in step S1217. In a case where the confirmation is successful, the CPU 401 of the tenant server 40 returns the device access token and the expiration date of the device access token to the MFP. This completes the "access token acquisition" phase. In a case where the acquisition of the device access token is not successful because the JWTs, which are key pairs for authentication, do not match each other in the CPU 401 of the tenant server 40, the sequence is started again from step S1215.

The above example has described posting the message 803 for making a print proposal in a chat format. This is not seen to be limiting. In another exemplary embodiment, a file can be uploaded, whereby a pop-up screen can be displayed on a message screen so that the pop-up screen can receive a print setting and a print instruction. In this case, the cooperative application A 506 causes the message application server 30 to generate the pop-up screen.

The configuration illustrated in the present exemplary embodiment is merely an example, and the present invention is not limited to the illustrated configuration.

Figure 15:
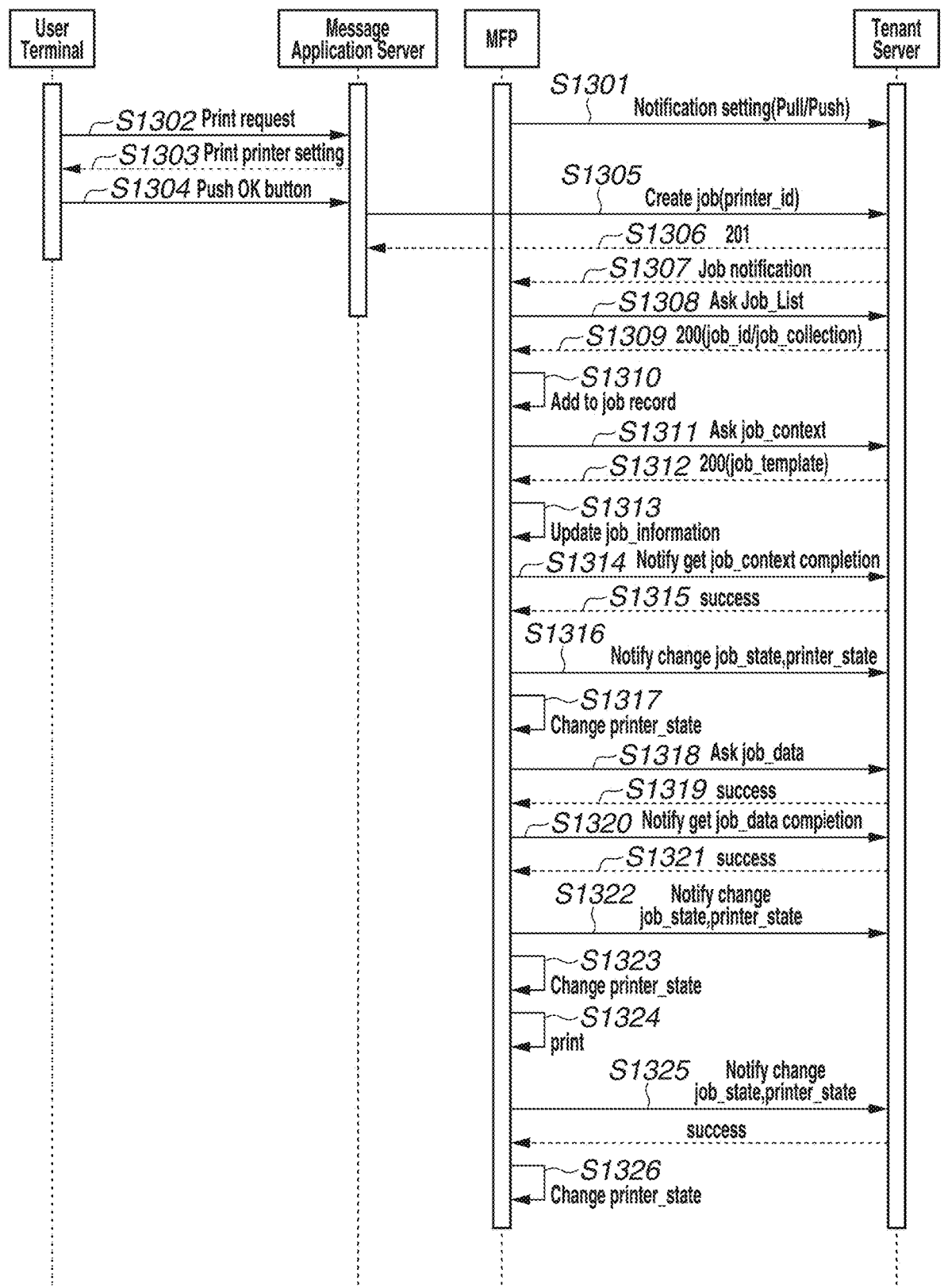
FIG. 15 is a diagram illustrating an example of a process in which the cooperative application installed on the message application server receives a print request from a user and an MFP executes printing.

FIG. 15 is a diagram illustrating an example of the process in which the cooperative application A 506 installed on the message application server 30 receives a print request from a user and an MFP executes printing. As the MFP that executes printing, an MFP associated with a user or a channel is registered in advance in the tenant server 40 as illustrated in FIG. 14.

In step S1301, an MFP requests the tenant server 40 to provide a notification to the MFP in a case where a print job to be performed by the MFP is registered. The notification includes a pull notification and a push notification, where either notification can be selected.

In step S1302, the CPU 301 of the message application server 30 determines whether the print button 805 is selected by the user in step S1017. In a case where the print button 805 is selected, the CPU 207 of the user terminal A 20 transmits a print request to the message application server 30.

In step S1303, the CPU 301 of the message application server 30 generates screen data for displaying a message for making a print setting. The message application server 30 transmits the generated screen data to the user terminal A 20. The user terminal A 20 updates the display on the operation panel 201 based on the received screen data.

In step S1304, in a case where a print execution button displayed on the user terminal A 20 is selected by the user, the processing proceeds to step S1305.

In step S1305, the CPU 301 of the message application server 30 makes a job generation request regarding a file for which a print proposal is made. Then, the CPU 301 of the message application server 30 transmits the job generation request with a printer ID to the tenant server 40.

In step S1306, the CPU 401 of the tenant server 40 receives the job generation request from the MFP. In a case where the generation of a job is successful, the CPU 401 of the tenant server 40 returns a generation response 201 to the message application server 30.

In step S1307, because the tenant server 40 is set to provide a notification to the MFP in a case where a job for the MFP is confirmed in step S1301, the CPU 401 of the tenant server 40 notifies the MFP that a job is registered.

In step S1308, the MFP having received the notification of the registration of the job from the tenant server 40 requests the tenant server 40 to send a job list.

In step S1309, the CPU 401 of the tenant server 40 returns the job list to the MFP.

In step S1310, the MFP having received the job list adds the received job list to the job record of the MFP.

In step S1311, the MFP requests the tenant server 40 to acquire job information.

In step S1312, the CPU 401 of the tenant server 40 returns a job template in which the job information is described.

In step S1313, the MFP updates job information in the device using the returned job template.

In step S1314, the MFP notifies the tenant server 40 that the acquisition of the information that the MFP has requested in step S1311 is completed.

In step S1315, the CPU 401 of the tenant server 40 returns a response indicating that the reception of the notification in step S1314 is successful.

In step S1316, the MFP notifies the tenant server 40 that the job state in the device and the device state are to be changed to "print preparation completion".

In step S1317, the MFP updates the device state in the device.

In step S1318, the MFP requests the tenant server 40 to acquire job information.

In step S1319, the CPU 401 of the tenant server 40 receives the job information acquisition request from the MFP and returns the job information.

In step S1320, the MFP notifies the tenant server 40 that the acquisition of the information that the MFP has requested in step S1318 is completed.

In step S1321, the CPU 401 of the tenant server 40 returns a response indicating that the reception of the notification in step S1320 is successful.

In step S1322, the MFP notifies the tenant server 40 that the job state and the device state are to be changed to "printing".

In step S1323, the MFP changes the device state in the device to "printing".

In step S1324, the MFP executes printing.

In step S1325, the MFP notifies the tenant server 40 that the job state and the device state are to be changed to "printing".

In step S1326, the MFP changes the device state in the device to "waiting for job".

The above-described configuration enables preventing an unnecessary message from being displayed when, in response to the uploading of data to a chat room, it is confirmed whether to cause a printer to print the data.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)?), a flash memory device, a memory card, and the like.

While the present disclosure has been described with reference to exemplary embodiments, it is to be understood that these embodiments are not seen to be limiting. The scope of the following claims is to be accorded the broadest interpretation so as to encompass all such modifications and equivalent structures and functions.

This application claims the benefit of Japanese Patent Application No. 2021-144484, filed Sep. 6, 2021, which is hereby incorporated by reference herein in its entirety.

What is claimed is:

1. An information processing method comprising:
executing, based on detecting an upload of image data to a channel of chat service, a posting process for posting a post including an instruction object to the channel, the instruction object being a button for inputting a print instruction to execute a printing process based on the image data;
causing, based on the print instruction input via the instruction object, an image forming apparatus to execute the printing process based on the image data; and
specifying a state of the image forming apparatus,
wherein, in a case where the specified state of the image forming apparatus is a first state, the post including the instruction object is posted by executing the posting process, wherein, in a case where the specified state of the image forming apparatus is a second state which is different from the first state, the posting process is not executed, wherein the specified state includes a third state indicating that a consumable product of the image forming apparatus is insufficient, and wherein, in a case where the specified state of the image forming apparatus is the third state, the posting process for posting the post including the instruction object and information indicating that the consumable product is insufficient to the channel is executed.

2. The information processing method according to claim 1, further comprising acquiring state information of the image forming apparatus, wherein the state of the image forming apparatus is specified based on the acquired state information.

3. The information processing method according to claim 2, wherein the posting process is not executed in a case where the state information is not acquired.

4. The information processing method according to claim 1, wherein the image forming apparatus is associated with a user having logged into an information processing apparatus configured to execute the information processing method.

5. The information processing method according to claim 4, wherein the posting process is not executed in a case where there is no image forming apparatus associated with the user.

6. The information processing method according to claim 1, wherein the post includes an object for setting the printing process.

7. A non-transitory computer-readable storage medium storing a program that, when executed by an information processing apparatus, causes the information processing apparatus to perform a method, the method comprising:

executing, based on an upload of image data to a channel of chat service, a posting process for posting a post including an instruction object to the channel, the instruction object being a button for inputting a print instruction to execute a printing process based on the image;

causing, based on the print instruction input via the instruction object, an image forming apparatus to execute the printing process based on the image data; and specifying a state of the image forming apparatus, wherein, in a case where the specified state of the image forming apparatus is a first state, the post including the instruction object is posted by executing the posting process, wherein, in a case where the specified state of the image forming apparatus is a second state which is different from the first state, the posting process is not executed, wherein the specified state includes a third state indicating that a consumable product of the image forming apparatus is insufficient, and wherein, in a case where the specified state of the image forming apparatus is the third state, the posting process for posting the post including the instruction object and information indicating that the consumable product is insufficient to the channel is executed.

8. The non-transitory computer-readable storage medium according to claim 7, wherein the method further comprises acquiring state information of the image forming apparatus, and wherein the state of the image forming apparatus is specified based on the acquired state information.

9. The non-transitory computer-readable storage medium according to claim 8, wherein the posting process is not executed in a case where the state information is not acquired.

10. The non-transitory computer-readable storage medium according to claim 7, wherein the image forming apparatus is associated with a user having logged into the information processing apparatus configured to execute the program.

11. The non-transitory computer-readable storage medium according to claim 10, wherein the posting process is not executed in a case where there is no image forming apparatus associated with the user.

12. The non-transitory computer-readable storage medium according to claim 7, wherein the post includes an object for setting the printing process.

13. An information processing apparatus comprising:

at least one memory; and at least one processor in communication with the at least one memory, the at least one processor executing a program stored in the memory to cause the information processing apparatus to:

execute, based on detecting an upload of image data to a channel of chat service, a posting process for posting a post including an instruction object to the channel, the instruction object being a button for inputting a print instruction to execute a printing process based on data uploaded to a channel of a chat service to the channel;

cause, based on the print instruction input via the instruction object, an image forming apparatus to execute the printing process based on the image data; and specify a state of the image forming apparatus, wherein, in a case where that the specified state of the image forming apparatus is a first state, the post including the instruction object is posted by executing the posting process, wherein, in a case where the specified state of the image forming apparatus is a second state which is different from the first state, the posting process is not executed, wherein the specified state includes a third state indicating that a consumable product of the image forming apparatus is insufficient, and wherein, in a case where the specified state of the image forming apparatus is the third state, the posting process for posting the post including the instruction object and information indicating that the consumable product is insufficient to the channel is executed.

* * * * *

UNITED STATES PATENT AND TRADEMARK OFFICE
CERTIFICATE OF CORRECTION

PATENT NO. : 12,206,628 B2  
APPLICATION NO. : 17/822061  
DATED : January 21, 2025  
INVENTOR(S) : Anna Hosaka Page 1 of 1

It is certified that error appears in the above-identified patent and that said Letters Patent is hereby corrected as shown below:

On the Title Page

In item (30) the Foreign Application Priority Data section, please correct to add the following text: September 6, 2021 (JP) 2021-144484

Signed and Sealed this  
Fifteenth Day of April, 2025

Coke Morgan Stewart  
*Acting Director of the United States Patent and Trademark Office*